United States Patent Office 3,075,988
Patented Jan. 29, 1963

3,075,988
PYRIDYL AMIDES
William Laszlo Bencze, New Providence, N.J., assignor to Ciba Corporation, a corporation of Delaware
No Drawing. Filed Mar. 29, 1961, Ser. No. 99,050
2 Claims. (Cl. 260—295.5)

The present invention relates to 3,3-bis-(4-pyridoyl-amino-phenyl)-butan-2-ones, in which pyridoyl stands for the acyl radical of a pyridine carboxylic acid, and which have the formula:

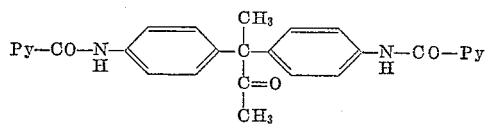

in which Py stands for pyridyl, especially 3-pyridyl, as well as 2-pyridyl and 4-pyridyl. 3,3-bis-(4-amino-phenyl)-butan-2-one and 3,3-bis-(4-lower alkanoylamino-phenyl)-butan-2-ones (U.S. Patent No. 2,901,508) are known to exhibit rather unspecific inhibiting effects on the secretion of adrenocortical steroids, such as compound F (hydrocortisone), compound S (11-desoxy-17α-hydroxy-corticosterone) and compound B (corticosterone). In addition, these adrenal inhibiting properties may be accompanied by severe side effects, such as progestational activities, hypothermic effects, inhibition of the thyroid gland, liver hypertrophy, etc. and these compounds are, therefore, unsuitable for long term treatments. I have now found that the compounds of this invention, and particularly the 3,3-bis-(4-nicotinoylamino-phenyl)-butan-2-one of the formula:

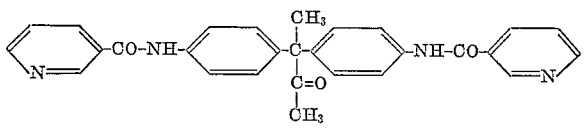

have very specific effects on the secretion of steroid hormones by the adrenal cortex; thus, they cause a decrease in the secretion of compound F (hydrocortisone), accompanied by an increase in the secretion of compound B (corticosterone), and they have no effect on the excretion of compound S (11-desoxy-17α-hydroxy-corticosterone). In view of these specific effects on the secretion pattern of adrenal corticoid hormones, the compounds of this invention can be used as diagnostic tools for the determination of the functioning of the pituitary gland, or in the treatment of adrenal cortical hyperfunction, as observed in Cushing's syndrome, primary aldosteronism, secondary aldosteronism and the like. Furthermore, the specific decrease of compound F secretion and increase of compound B secretion make the compounds of this invention very useful as aids in the study of biosynthetic pathways of corticoid synthesis.

The compounds of this invention may be used in the form of pharmaceutical preparations, which contain the 3,3-bis-(4-pyridoylamino-phenyl)-butan-2-ones in mixture with a pharmaceutical organic or inorganic, solid or liquid carrier suitable for enteral or parenteral administration. For making up the preparation there may be employed substances which do not react with the new compounds, such as water, gelatine, lactose, starches, stearic acid, magnesium stearate, stearyl alcohol talc, vegetable oils, benzyl alcohols, gums, propylene glycol, polyalkylene glycols or any other inert carrier used for medicaments. The pharmaceutical preparations may be in the solid form, for example, as capsules, tablets, dragees and the like, or in liquid form, for example, as solutions, suspensions, emulsions and the like. If desired, they may contain auxiliary substances, such as preserving, stabilizing, wetting, emulsifying agents and the like, salts for varying the osmotic pressure, buffers, etc. They may also contain, in combination, other useful substances.

The compounds of this invention can be prepared according to methods which are known in themselves. Thus, they may be prepared by reacting 3,3-bis-(4-amino-phenyl)-butan-2-one with a reactive functional derivative of a pyridine carboxylic acid.

A reactive functional derivative of a pyridine carboxylic acid capable of forming with the amino groups of the starting material the desired amide groupings, is the acid halide, particularly the chloride, and the anhydride of a pyridine carboxylic acid. The pyridine carboxylic acid halide, e.g. chlorine, is preferably used in the presence of a base; especially useful are liquid organic bases, such as pyridine, collidine, lutidine, N,N,N-trimethylamine, N,N-dimethyl-N-ethylamine, N,N,N-triethylamine, N,N,N',N'-tetramethyl-1,6-hexylene-diamine, N,N-dimethylaniline and the like, which reagents may be used simultaneously as diluents. Other bases, such as inorganic basic salts, e.g. sodium carbonate, potassium carbonate and the like, may also be used, but require the presence of a suitable organic diluent. A pyridine carboxylic acid anhydride may be used in the absence or in the presence of a suitable inert organic diluent. If necessary, the reaction is carried out while cooling or at an elevated temperature, and/or, at the atmosphere of an inert gas, e.g. nitrogen. In view of the fact that two amino groups are to be acylated, at least two mols of the reactive functional derivative of the pyridine carboxylic acid are being employed, while large excesses of the reagent should be avoided.

The compounds of this invention may also be prepared by treating a 2,3-bis-(4-pyridylamino-phenyl)-butan-2,3-diol with a strong Lewis acid.

The above pinacolone rearrangement is preferably carried out under anhydrous conditions to avoid a cleavage of the amide groups. Concentrated sulfuric acid, which, if necessary, may contain sulfur trioxide, represents the reagent of choice. The rearrangement may be carried out at room temperature or while cooling; if necessary, the temperature may be raised, although some cleavage of the amide groupings has to be expected at an elevated temperature. Other reagents which may cause the above described rearrangement are, for example, polyphosphoric, p-toluene sulfonic acid and the like.

The invention also comprises any modification of the process wherein a compound obtainable as an intermediate at any stage of the process is used as starting material and the remaining step(s) of the process is (are) carried out, as well as any new intermediates.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

*Example*

A solution of 18.8 of 3,3-bis-(4-amino-phenyl)-butan-2-one in 60 ml. of pyridine is cooled in an ice bath; a total of 20.0 g. of freshly distilled nicotinic acid chloride is added in portions, and the resulting cherry red solution is allowed to stand overnight at room temperature. The pyridine is removed under reduced pressure, water is added to the oily residue, and the organic material is extracted three times with ethyl acetate. The combined extracts are washed with a saturated solution of sodium chloride in water, dried over sodium sulfate and evaporated to dryness under reduced pressure. The oily residue is again taken up in ethyl acetate, and hexane is added until the solution becomes turbid. Small amounts of ethanol and chloroform are added to clear the solution which is then allowed to stand for several hours. The desired 3,3-bis-(4-nicotinoylamino-phenyl)-butan-2-one of the formula:

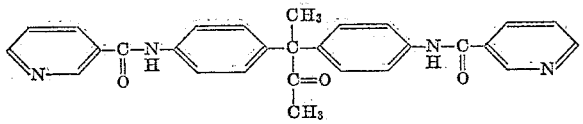

crystallizes, is filtered off (yield: 20.0 g.) and is recrystallized from ethyl acetate, M.P. 195–197°.

In the above reaction the nicotinic acid chloride may be replaced by pyridine 2-carboxylic acid chloride or isonicotinic acid chloride; when reacted with these reagents in the presence of pyridine the 3,3-bis-(4-amino-phenyl)-butan-2-one yields the 3,3-bis[4-(2-pyridoyl)-amino-phenyl]-butan-2-one and the 3,3-bis-(4-isonicotinoyl-amino-phenyl)-butan-2-one, respectively.

What is claimed is:
1. 3,3-bis-(4-pyridoylamino-phenyl)-butan-2-one.
2. 3,3-bis-(4-nicotinoylamino-phenyl)-butan-2-one.

References Cited in the file of this patent
UNITED STATES PATENTS

| | | |
|---|---|---|
| 2,654,758 | Papa et al. | Oct. 6, 1953 |
| 2,698,327 | Cusic | Dec. 28, 1954 |
| 2,901,508 | Korman | Aug. 25, 1959 |
| 2,980,685 | Druey | Apr. 18, 1961 |